United States Patent [19]

Reed

[11] Patent Number: 4,799,401

[45] Date of Patent: Jan. 24, 1989

[54] EXTENDED RANGE HYDROMECHANICAL STEERING TRANSMISSION

[75] Inventor: Bradley O. Reed, Pittsfield, Mass.

[73] Assignee: General Electric Company, Pittsfield, Mass.

[21] Appl. No.: 98,165

[22] Filed: Sep. 18, 1987

[51] Int. Cl.$^4$ .............................................. F16H 47/0
[52] U.S. Cl. ........................................... 74/677; 74/687
[58] Field of Search ............... 74/677, 682, 687, 720, 74/720.5

[56] References Cited

U.S. PATENT DOCUMENTS

| | | | |
|---|---|---|---|
| 3,442,153 | 5/1969 | Ross | 74/687 |
| 3,575,066 | 4/1971 | Livezey et al. | 74/687 X |
| 3,596,535 | 8/1971 | Polak | 74/720.5 |
| 3,815,698 | 6/1974 | Reed | 180/6.48 |
| 4,183,264 | 1/1980 | Reed | 74/720.5 |
| 4,345,488 | 8/1982 | Reed | 74/682 |
| 4,485,691 | 12/1984 | Reed | 74/687 |
| 4,682,515 | 7/1987 | Reed | 74/687 |

Primary Examiner—Leslie A. Braun
Assistant Examiner—Dwight G. Diehl
Attorney, Agent, or Firm—Bailin L. Kuch; Robert A. Cahill

[57] ABSTRACT

A simplified range changing mechanism for an infinitely variable, split output, synchronously shifting hydromechanical steering transmission having integral steering and four forward ranges wherein the first, second and third forward ranges have progressively lower torque and higher speed propulsion ratios, while the fourth forward range is basically a repeat of the second range, by at a higher gear ratio. Positive steer with constant steering torque ratio is maintained in all four ranges.

14 Claims, 1 Drawing Sheet

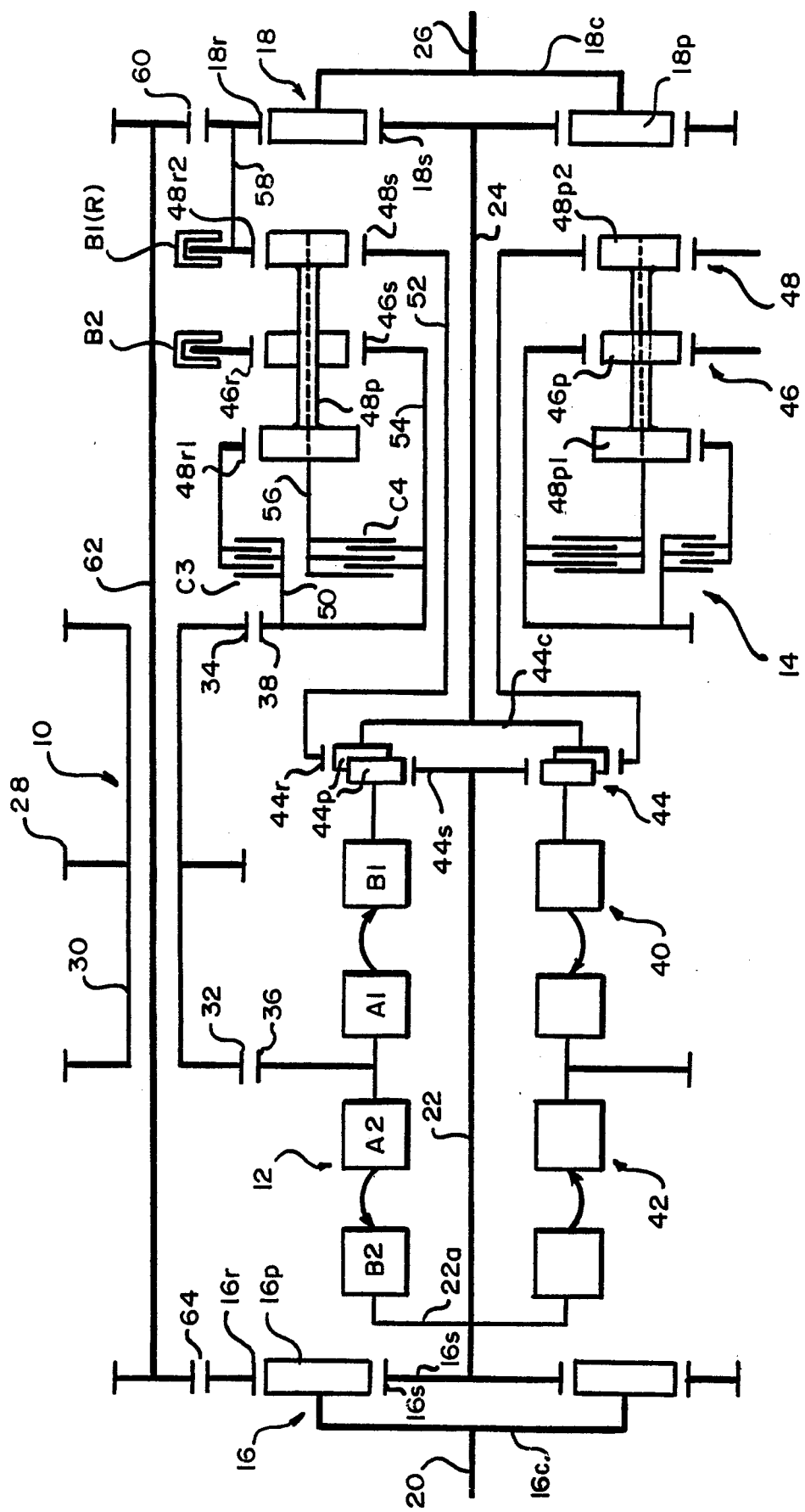

EXTENDED RANGE HYDROMECHANICAL STEERING TRANSMISSION

BACKGROUND OF THE INVENTION

This invention relates to synchronous shifting multi-range hydromechanical steering transmissions for track-laying or skid-steered wheeled vehicles having hydraulic components to provide continuously variable hydrostatic drive ratios and mechanical components whose operations are selectively controlled by clutches and brakes to cause the transmission to operate in a plurality of distinct hydrostatic and hydromechanical ranges, and wherein steering is effected by using one or more hydrostatic device to impose a speed difference between left and right transmission outputs. More specifically, the present invention relates to such transmissions having internal, integral steering resulting from the utilization of the same hydrostatic units for both drive and steer rather than from the use of separate, dedicated hydrostatic units to impose a speed differential between the left and right transmission outputs to effect steering. In particular, this invention pertains to that class of multiple range steering transmissions which also has distinctly different speed and torque ratios in the various ranges and avoids the use of clutches in the steer path.

The present invention is an improvement over the steering transmission disclosed in applicant's U.S. Pat. No. 4,485,691, entitled "Simplified Hydromechanical Steering Transmission" which, in turn, is an improvement over the steering transmission disclosed in applicant's U.S. Pat. No. 4,345,488, entitled "Hydromechanical Steering Transmission". The disclosures of these patents are specifically incorporated herein by reference.

It is a principle object of the present invention to provide an improved single major axis hydromechanical steering transmission.

Another object of the present invention is to provide a hydromechanical transmission of the above character having an improved range changing mechanism.

An additional object is to provide a hydromechanical transmission of the above-character wherein the range changing mechanism is capable of producing at least four forward speed ranges.

Another object is to provide a hydromechanical transmission of the above-character wherein the range changing mechanism is of a simplified and economical construction, and is efficient and reliable in operation.

Other objects of the invention will in part be obvious and in part appear hereinafter.

BRIEF DESCRIPTION OF THE INVENTION

In accordance with the present invention, there is provided an infinitely variable, split output, synchronously shifting, multi-range hydromechanical transmission having a hydrostatic first range in full reversing configuration and second, third and fourth hydromechanical ranges afforded by a simplified range changing mechanism. A difference in right and left output speeds to effect internal steering, i.e., steering differential, is available in all ranges from hydrostatic units whose outputs hydrostatically power a first range and in conjunction with mechanical inputs hydromechanically power second, third and fourth ranges. Propulsion ratios in the first, second and third ranges are mutually independent and, as result of that independence, each of these first three ranges can be made to have an independent and distinct propulsion torque ratio, while maintaining the same steer torque ratio throughout. As a consequence, the gear ratios can be individually engineered in each of the first three speed range to best meet all requirements of torque, speed, vehicle weight, etc. The fourth speed range is, in accordance with the present invention, basically a repeat of the second speed range, but at a higher gear ratio. Steer torque in the fourth range is nevertheless the same as in the other ranges. The hydromechanical steering transmission of the present invention thus accomplishes the end result in a single major axis configuration with a reduced number of range changing mechanism elements, as compared to the prior art.

The invention accordingly comprises the features of construction, combination of elements, and arrangement of parts which will be exemplified in the construction hereinafter set forth, and the scope of the invention we indicated in the claims.

For a fuller understanding of the nature and objects of the invention, reference should be made to the following detailed description taken in conjunction with the accompanying drawing, in which the sole FIGURE is a schematic illustration of a single major axis hydromechanical steering transmission constructed in accordance with the present invention.

DETAILED DESCRIPTION

As seen in the drawing, the extended, multi-range hydromechanical steering transmission of the present invention includes an input gear train, generally indicated at 10, a first range and steer mechanism, generally indicated at 12, a range changing mechanism, generally indicated at 14, and left and right output combining planetary gear sets, generally indicated at 16 and 18, respectively. First range and steer mechanism 12, range changing mechanism 14, left output planetary gear set 16 and right output planetary gear set 18 are seen to be symmetrically arranged about a single major axis constituted by a series of axially aligned shafts, namely left output shaft 20, shaft 22, shaft 24, and right output shaft 26. Input gear train 10 is seen to include an input spur gear 28 which drives a sleeve shaft 30 carrying transfer gears 32 and 34. Input gear 28 is driven typically at a constant speed by a suitable prime mover, such as a diesel or gas turbine engine. Transfer gear 32 engages a gear 36 to supply input power to first range and steer mechanism 12, while transfer gear 34 engages a gear 38 to supply input power to range changing mechanism 14.

First range and steer mechanism 12 includes a compatible pair of hydrostatic units, generally indicated at 40 and 42, each including a hydrostatic pump and a hydrostatic motor operatively coupled in compatibly paired relation. Thus, hydrostatic unit 40 includes a pump A1 and a motor B1, while hydrostatic unit 42 includes a pump A2 and a motor B2. These hydrostatic units may be of the ball piston type such as disclosed and illustrated in FIGS. 2 and 3 of applicant's U.S. Pat. No. 3,815,698. While both the hydrostatic pump and motor of each unit may be designed to provide infinitely variable capacities, preferably each pump A1, A2 is constructed as a variable capacity, positive displacement ball piston pump receiving input power via transfer gears 32, 36 and each motor B1, B2 as a fixed capacity, positive displacement ball piston motor, each in closed hydraulic circuit relationship with its respective pump. The motors B1, B2 can thus be made to turn at infinitely variable speeds in either direction corresponding to the capacity settings of the variable pumps A1, A2, and thereby provide hydrostatic outputs over a range of output speeds from full forward to full reverse. The output of hydraulic motor B2 is applied via connection 22a to drive shaft 22 which, in turn, drives the sun gear 16s of left output planetary gear set 16 and the sun gear 44s of a planetary gear set generally indicated at 44. Hydraulic motor B1 of hydrostatic unit 40 is connected to drive the carrier 44c of planetary gear set 44; this carrier in turn being connected to drive shaft 24 and the sun gear 18s of right output planetary gear set 18. The left transmission output on shaft 20 is obtained from carrier 16c mounting the pinion gears 16p of left planetary gear set 16, while the right transmission output on shaft 26 is obtained from carrier 18c mounting the pinion gears 18p of right planetary gear set 18. It is thus seen that by varying the displacements of pumps A1, A2, shafts 22 and 24 can be driven hydrostatically at infinitely variable speeds from a maximum speed in one direction to a maximum speed in the other direction, either independently or coincidentally.

Range changing mechanism 14 is seen to include two planetary gear sets generally indicated at 46 and 48. Ring gear 44r of planetary gear set 44 is connected to drive the sun gear 48s of planetary gear set 48 via a sleeve shaft 52. The mechanical input of drive train 10 is applied to the sun gear 46s of planetary gear set 46 via transfer gears 34, 38 and sleeve shaft 54. This mechanical input is also selectively applied by a connection 50 to a first ring gear 48r1 of planetary gear set 48 via a clutch C3. In accordance with a feature of the present invention, planetary gear set 48 is equipped with a set of duplex pinion gears 48p, each integrally formed with first and second axially separated gear sections 48p1 and 48p2. These pinion gears 48p and pinion gears 46p of planetary gear set 46 are mounted on a single carrier 56 to which the mechanical input on sleeve shaft 54 is also selectively applied through a clutch C4. Ring gear 46r of planetary gear set 46 is selectively grounded by a brake B2, while ring gear 48r2 of planetary gear set 48 is selectively grounded by a brake B1(R). This latter ring gear 48r2 is also mechanically tied to the ring gear 18r of right output planetary gear set 18 by a connection 58. The motion of ring gear 18r is coupled via transfer gears 60, cross shaft 62 and transfer gears 64 to the ring gear 16r of the right output planetary gear set 16. Finally, planetary gear set 44 is seen to be a double pinion planetary set, in that it is equipped with dual pinions 44p whose carrier 44c is connected to shaft 24.

Considering now the operation of the hydromechanical steering transmission illustrated in the drawing, if all of the various brakes and clutches are disengaged, there are no reactions imposed on the various planetary gears to the mechanical and hydrostatic inputs supplied thereto, and the transmission is in neutral. If however brake B1(R) is engaged, ring gear 48r2 of planetary gear set 48 is grounded, as are ring gear 18r of right output planetary gear set 18 via connection 58 and ring gear 16r of left output planetary gear set 16 via transfer gearing 60, 64 and their interconnecting cross shaft 62. Consequently, gear changing mechanism is, in effect, locked out, and only the hydrostatic outputs of units 40 and 42 are effective in driving the right and left transmission output shafts 26 and 20. Specifically, the hydrostatic output of motor B1 drives sun gear 18s of right planetary gear set 18 via carrier 44c of planetary gear set 44 and shaft 24. By virtue of the reaction afforded by the braked ring gear 18r, the rotation of sun gear 18s causes pinion gears 18p to revolve, and their carrier 18c drives right transmission output shaft 26. Similarly, the hydrostatic output of motor B2 in hydrostatic unit 42 drives shaft 22 and sun gear 16s of left output planetary gear set 16. Since ring gear 16r thereof is also grounded by brake B1(R), reaction is imparted to the left output planetary gear set 16, and its pinions 16p revolve to drive left output shaft 20 via their carrier 16c.

It is thus seen that the transmission output shafts 20 and 26 are driven by the hydraulic motors through the right and left transmission output planetary gear sets 18 and 16 at a sun-to-carrier reduction so that the output speed of each of these transmission output shafts in the first range bears a direct relationship to the speed of the respective hydrostatic inputs. Thus, the vehicle can be driven in a hydrostatic range from zero to first range top speed forward or in reverse according to the direction of rotation and change of displacement of the hydraulic pumps A1, A2 to constitute a combined first forward and reverse speed range. Steering maneuvers are accomplished in the manner disclosed in applicant's above cited U.S. Patents by establishing relative differences in the capacity settings of the hydraulic pumps A1, A2, with the result that the hydraulic motors B1, B2 run proportionally at speeds sufficiently different from each other to produce output speed differentials between transmission output shafts 20 and 26, and the vehicle executes a sterring maneuver. Steering in this manner is infinitely variable between no steer and full pivot steer wherein pumps A1, A2 would be stroked in opposite directions causing hydrostatic motors B1, B2 to run, one forward, and one in reverse.

As will be seen, second, third and fourth speed ranges are provided by range changing mechanism 14 which, as described above, comprises a compound planetary gear set having two sets of pinion gears 46p and 48p mounted on a single carrier 56; these pinion gears intermeshing with two sun gears 46s and 48s and with three ring gears 46r, 48r1 and 48r2 to provide the desired higher range output functions. The second, third and fourth speed ranges are hydromechanical in view of the fact that both mechanical and hydrostatic inputs to mechanism 14 are utilized. As noted in applicant's above cited U.S. Patents, a primary characteristic of transmissions of this class is the fact that the hydrostatic contributions to the hydromechanical ranges, although derived from the same hydrostatic units, i.e., units 40 and 42, that provide right and left transmission output speed differential for steering, are not limited by the particular steer torques and speeds developed by these hydrostatic units. This is achieved through the utilization of planetary gear set 44 as a speed averaging device to develop an average of the output speeds of motors B1 and B2 (B average) for use as a hydrostatic input to range changing mechanism 14. As previously described, hydrostatic motor B2 drives its output shaft 22 directly, whereas hydrostatic motor B1 drives hydrostatic output shaft 24 through carrier 44c of planetary gear set 44. Because motor B1 drives carrier 44c and motor B2 drives sun gear 44s, if planetary gear set 44 is established as a 50/50 set, the average of the B1 and B2 motor speeds is produced on ring gear 44r. For a more detailed description of such a speed averaging, dual pinion planetary gear set, reference may be had to applicant's above cited U.S. Pat. No. 3,815,698. Thus, while the separate and at times different B1 and B2 motor output speeds are applied to the sun gears 18s and 16s of the right and left transmission output planetary gear sets 18 and 16, the average of the B1 and B2 motor output speeds is developed on ring gear 44r to provide a hydrostatic input driving sun gear 48s via sleeve shaft 52 which does not vary due to steering. This is true if, to effect a steer, the output speed of one motor is increased by exactly the same amount that the other motor's output speed is decreased. The average of the two motor output speeds is thus unchanged, enabling the B average hydrostatic output developed on ring gear 44r to serve as a "steer cancelling" input to planetary gear 48. The net result is that the speed of the interconnected ring gears 18r and 16r does not vary during a steering maneuver, and thus the speed differential produced on output shafts 20 and 26 is always directly related to the speeds of motors B1, B2 and proportional to the differential motor speed.

To shift range changing mechanism 14 into a second speed range, brake B1(R) is released, and brake B2 is engaged to ground ring gear 46r of planetary gear set 46. Thusly braked, ring gear 46r constitutes reaction to the mechanical input on sun gear 46s, and the B1, B2 motor average hydrostatic input developed on ring gear 44r and supplied to sun gear 48s. These mechanical and hydrostatic inputs, reduced by sun-to-carrier reductions, produce a resultant speed function on unitary carrier 56, which is transferred to ring gear 48r and thence to ring gear 18r. This second range hydromechanical output speed component acting on ring gear 18r and the motor B1 hydrostatic output speed component acting on sun gear 18s are combined by planetary gear set 18 to produce a final second range output on carrier 18c which is seen to be a function of mechanical input speed and torque, the average speed of motors B1 and B2, the speed of motor B1, and the ratios of planetary gear sets 46, 48, and 18. The ratios of these planetary gear sets can therefore be calculated to provide the desired torque and speed characteristics in the second range.

The same hydromechanical output applied to ring gear 18r is also applied to ring gear 16r of the left output planetary gear set 16 by means of cross shaft 62 and transfer gearing 60 and 64. This second range hydromechanical output on ring gear 16r is combined with the hydrostatic output of motor B2 applied to sun gear 16s to produce a final output on left transmission output shaft 20 which would differ from that produced on right transmission output shaft 26 only by the speed differences imposed by differential strokings of pumps A1 and A2 to affect steering maneuvers. It will be appreciated that the operating spped in the second range is infinitely variable throughout the second range simply by uniformly varying the capacity settings of pumps A1 and A2 in synchronism.

To shift into the third speed range from the second speed range, brake B2 is released, and clutch C3 is engaged. This is seen to apply the mechanical input from gear train 10 to ring gear 48r1 of planetary gear set 48. Reaction to this mechanical input is provided by the "B average" hydrostatic input on sun gear 48s and thus a resultant hydromechanical output is produced on unitary planetary carrier 56 and transferred to ring gears 48r2, 18r and 16r. It is thus seen that the third range input components include the mechanical input on ring gear 48r1, the B average hydrostatic input on sun gear 48s, and the B1 and B2 motor hydrostatic inputs on sun gears 18s and 16s, respectively. It will be noted that, since there is no reaction to the mechanical input on sun gear 46s, planetary gear set 46 simply goes along for the ride and does not contribute any speed and torque components to the third speed range. As in the second speed range, third range speed is infinitely variable, and any differential in the outputs of motors B1 and B2 will result in a third range steering maneuver.

Finally, to shift from the third speed range into the fourth speed range, clutch C3 is disengaged and clutch C4 is engaged. This imparts the mechanical input of drive train 10 appearing on sleeve shaft 54 directly, i.e. without reduction, to the unitary planetary carrier 56 for reaction with the B average hydrostatic input imparted to sun gear 48s of planetary gear set 48. The resultant hydromechanical output appearing on ring gear 48r2 is delivered to ring gear 18r of the right output planetary gear set 18 and to the ring gear 16r of the left output planetary gear set 16 where it is combined with the hydrostatic inputs of motors B1 and B2 separately applied to sun gears 18s and 16s, respectively. Thus the speed and torque components contributing to operation of the transmission in its fourth range are the mechanical input to unitary planetary carrier 56, the average hydrostatic inputs of motors B1 and B2 applied to sun gear 48s, and the respective hydrostatic inputs of motors B1 and B2. It is seen that the fourth range is basically a repeat of the second range except that in the latter, carrier 56 speed is a function of the planetary gear 46 sun-carrier reduction of mechanical input speed on sleeve shaft 54, whereas in the former, carrier spped is equal to the mechanical input on this sleeve shaft. It will be noted that planetary gear set 46 does not contribute speed and torque components to fourth range transmission operation since its pinion gears 46p simply revolve without rotation in response to the mechanical inputs on sun gear 46s and unitary carrier 56, and since there is no reaction to this motion imparted by ring gear 46r.

With the proper selection of gear ratios in the planetary gear sets 46 and 48, the second, third and fourth ranges can be designed to produce requisite torque and propulsion ratios for operation in these higher speed ranges. Since hydrostatic input differentials for steering are applied directly to the sun gears of the output planetary gears 16 and 18, and thus not through range changing mechanism 14, steer torque is the same in all ranges.

From the foregoing description, it is seen that the present invention provides a four speed hydromechanical transmission utilizing a significantly simplified range changing mechanism. As compared to the transmission disclosed in applicant's U.S. Pat. No. 4,485,691, wherein the corresponding range changing mechanism requires two ring gears, three sets of planetary pinion gears, three sun gears and one planetary carrier, range changing mechanism 14 herein requires three ring gears, only two sets of planetary pinion gears, only two sun gears and one planetary carrier. Yet, range changing mechanism 14 provides an additional, fourth range, whereas the prior art mechanism provides only three ranges. Since the third range mechanical input is applied to a ring gear, i.e., ring gear 48r1, rather than a sun gear, as in U.S. Pat. No. 4,485,691, the widths of this ring gear and its engaging pinion gear section 48p1 can be reduced to save weight and to enhance third range efficiency. Also, by providing pinion gears 48p in duplex configuration, and thus reducing the number of pinion gear sets from three to two, the pinion gear lubrication circuit is simplified.

It will thus be seen that the objects set forth above, including those made apparent in the preceding description are efficiently attained, and, since certain changes may be made in the disclosed embodiment without departing from the scope of the invention, it is intended that all matter contained in the above description and shown in the accompanying drawing shall be interpreted as illustrative and not in a limiting sense.

Having described the invention, what is claimed as new and desired to secure by Letters Patent is:

1. In a synchronous shifting, multi-range, split output hydromechanical transmission having a mechanical input drive train, a hydrostatic unit driven by said input drive train, and a set of combining gears for producing a transmission output, said set of combining gears including a first element connected to said hydrostatic unit such as to be driven hydrostatically to operate said transmission in a first range and a second element; a range changing mechanism comprising, in combination:

A. a compound planetary gear set including
   (1) a planetary carrier,
   (2) a first planetary gear including
      (a) a first pinion gear set mounted on said planetary carrier,
      (b) a first sun gear intermeshing with said first pinion gear set, and
      (c) a first ring gear intermeshing with said first pinion gear set, and
   (3) a second planetary gear including
      (a) a second pinion gear set including a plurality of duplex pinion gears, each having common first and second drivingly interconnected gear sections, said second pinion gear set mounted on said planetary carrier,
      (b) a second ring gear intermeshing with said first gear sections of said duplex pinion gears,
      (c) a third ring gear intermeshing with said second gear sections of said duplex pinion gears, and
      (d) a second sun gear intermeshing with one of said first and second gear sections of said duplex pinion gears;
B. first means drivingly connecting said third ring gear to said second element of said combining gear set;
C. second means drivingly connecting said input drive train to said compound planetary gear set;
D. third means drivingly connecting said hydrostatic unit to said compound planetary gear set; and
E. fourth means for selectively activating and inactivating elements of said compound planetary gear set such that, in response to the application of said mechanical and hydrostatic inputs to said compound planetary gear set from said input drive train and said hydrostatic unit, respectively, said first element of said combining gear set is hydrostatically driven and said second element of said combining gear set is hydromechanically driven in a manner to operate said transmission in at least two higher ranges in addition to said first range, said fourth means including a first brake for selectively inactivating said thrid ring gear to lock out said range changing mechanism and thus operate said transmission in said first range by the hydrostatic input applied to said first element of said combining gear set by said hydrostatic unit.

2. The transmission defined in claim 1, wherein said fourth means includes a plurality of brakes and clutches, whereby said transmission is operated in second, third, and fourth ranges in addition to said first range.

3. The transmission defined in claim 1, wherein said mechanical input is applied to said first sun gear, and said fourth means further includes a second brake for selectively inactivating said first ring gear, whereby to operate said transmission in a second range.

4. The transmission defined in claim 3, wherein said fourth means further includes a first clutch for selectively activating said second ring gear by coupling said mechanical input thereto, whereby said transmission is operated in a third range.

5. The transmission defined in claim 4, wherein said fourth means further includes a second clutch for selectively activating said planetary carrier by coupling said mechanical input thereto, whereby said transmission is operated in a fourth range.

6. The transmission defined in claim 5, wherein said hydrostatic input to said compound planetary gear set is applied to said second sun gear.

7. The transmission defined in claim 6, wherein said second sun gear intermeshes with said second gear sections of said duplex pinion gears.

8. In a synchronous shifting, multi-range, split output hydromechanical transmission having a mechanical input drive train, a hydrostatic unit driven by said input drive train to produce first and second infinitely variable hydrostatic inputs and a third hydrostatic input equal to the average of said first and second hydrostatic inputs, and first and second sets of combining gears, each set having first, second and third elements, said first elements of said first and second combining gear sets connected to respectively receive said first and second hydrostatic inputs such as to be driven hydrostatically to operate said transmission in a first range, said second elements of said first and second combining gear sets being drivingly interconnected by transfer gearing, and said third elements of said first and second combining gear sets constituting respective right and left transmission outputs; a range changing mechanism comprising, in combination:

A. a compound planetary gear set including
   (1) a planetary carrier,
   (2) a first planetary gear including
      (a) a first pinion gear set mounted on said planetary carrier,
      (b) a first sun gear intermeshing with said first pinion gear set, and
      (c) a first ring gear intermeshing with said first pinion gear set, and
   (3) a second planetary gear including
      (a) a second pinion gear set including a plurality of duplex pinion gears, each having common first and second drivingly interconnected gear sections, said second pinion gear set mounted on said planetary carrier,
      (b) a second ring gear intermeshing with said first gear sections of said duplex pinion gears,
      (c) a third ring gear intermeshing with said second gear sections of said duplex pinion gears, and
      (d) a second sun gear intermeshing with one of said first and second gear sections of said duplex pinion gears;
B. first means drivingly connecting said compound planetary gear set to said second element of said combining gear set;
C. second means drivingly connecting said input drive train to said compound planetary gear set;

D. third means drivingly connecting said third input of said hydrostatic unit to said second sun gear of said compound planetary gear set; and E. fourth means for selectively activating and inactivating elements of said compound planetary gear set such that, in response to the application of said mechanical and hydrostatic inputs to said compound planetary gear set from said input drive train and said hydrostatic unit, respectively, said first element of said combining gear set is hydrostatically driven and said second element of said combining gear set is hydromechanically driven in a manner to operate said transmission in at least two higher ranges in addition to said first range.

9. The transmission defined in claim 8, wherein said first means drivingly connects said third ring gear to said second element of one of said first and second combining gear sets, and said fourth means includes a first brake selectively inactivating said third ring gear to lock out said range changing mechanism, whereby said transmission is operated in said first range by said first and second hydrostatic inputs connected to said first elements of said first and second combining gear sets.

10. The transmission defined in claim 9, wherein said mechanical input is applied to said first sun gear, and said fourth means further includes a second brake for selectively inactivating said first ring gear, whereby to operate said transmission in a second range.

11. The transmission defining in claim 10, wherein said fourth means further includes a first clutch for selectively activating said second ring gear by coupling said mechanical input thereto, whereby said transmission is operated in a third stage.

12. The transmission defined in claim 11, wherein said fourth means further includes a second clutch for selectively activating said planetary carrier by coupling said mechanical input thereto, whereby said transmission is operated in a fourth range.

13. The transmission defined in claim 12, wherein said second sun gear intermeshes with said second gear sections of said duplex pinion gears.

14. In a synchronous shifting, multi-range, split output hydromechanical transmission having a mechanical input drive train, a hydrostatic unit driven by said input drive train, and a set of combining gears for producing a transmission output, said set of combining gears including a first element connected to said hydrostatic unit such as to be driven hydrostatically to operate said transmission in a first range and a second element; a range changing mechanism comprising, in combination:

A. a compound planetary gear set including
  (1) a single planetary carrier,
  (2) a plurality of sets of pinion gears mounted on said planetary carrier,
  (3) a plurality of ring gears intermeshing with said sets of pinion gears, and
  (4) a plurality of sun gears intermeshing with said sets of pinon gears;

B. first means drivingly connecting a first one of said ring gears to said second element of said combining gear set;

C. second means drivingly connecting said hydrostatic unit to a first one of said sun gears, whereby to drive said first sun gear hydrostatically;

D. third means connecting said input drive train to a second one of said sun gears, whereby to drive said second sun gear mechanically;

E. a first brake selectively operable to ground said first ring gear and thereby lock out said range changing mechanism, whereby to operate said transmission hydrostatically in said first range;

F. a second brake selectively operable to ground a second one of said ring gears, whereby to operate said transmission hydromechanically in a second range;

G. a first clutch selectively operable to drivingly connect said input drive train to a third one of said ring gears, whereby to operate said transmission hydromechanically in a third range; and H. a second clutch selectively operable to drivingly connect said input drive train to said planetary carrier, whereby to operate said transmission hydromechanically in a fourth range.

* * * * *